US011122083B1

(12) United States Patent
Quevedo

(10) Patent No.: US 11,122,083 B1
(45) Date of Patent: Sep. 14, 2021

(54) METHODS FOR MANAGING NETWORK CONNECTIONS BASED ON DNS DATA AND NETWORK POLICIES AND DEVICES THEREOF

(71) Applicant: F5 Networks, Inc., Seattle, WA (US)

(72) Inventor: Mark Quevedo, Seattle, WA (US)

(73) Assignee: F5 NETWORKS, INC., Seattle, WA (US)

( * ) Notice: Subject to any disclaimer, the term of this patent is extended or adjusted under 35 U.S.C. 154(b) by 248 days.

(21) Appl. No.: 16/125,272

(22) Filed: Sep. 7, 2018

Related U.S. Application Data

(60) Provisional application No. 62/555,902, filed on Sep. 8, 2017.

(51) Int. Cl.
*H04L 29/06* (2006.01)
*H04L 29/12* (2006.01)

(52) U.S. Cl.
CPC .......... *H04L 63/20* (2013.01); *H04L 61/1511* (2013.01); *H04L 61/2503* (2013.01); *H04L 63/0236* (2013.01); *H04L 63/102* (2013.01)

(58) Field of Classification Search
None
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

US 5,974,450 A, 10/1999, Maddalozzo, Jr. et al. (withdrawn)

(Continued)

*Primary Examiner* — Jeremiah L Avery
(74) *Attorney, Agent, or Firm* — Troutman Pepper Hamilton Sanders LLP (Rochester)

(57) ABSTRACT

Methods, non-transitory computer readable media, and network traffic manager apparatus that assists with managing network connections includes obtaining a destination internet protocol (IP) address and a domain name from a received request sent by a client. A determination is made about when the obtained domain name identifies a trusted service and the obtained destination IP address is included in a current host IP address list. The obtained destination IP address is replaced with a new IP address from the current host IP address list when the obtained domain name is determined to be present and the obtained destination IP address is determined to be absent from the current host IP address list. The received request is managed based on one or more network policies, wherein one of the one or more network policies includes providing the client access to the service identified by the obtained domain name hosted at the replaced new IP address.

20 Claims, 4 Drawing Sheets

(56) References Cited

U.S. PATENT DOCUMENTS

| | | |
|---|---|---|
| 5,167,024 A | 11/1992 | Smith et al. |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,754 A | 12/1996 | Fitzgerald et al. |
| 5,596,742 A | 1/1997 | Agarwal et al. |
| 5,606,655 A | 2/1997 | Arman et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,650 A | 6/1998 | Chapman et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,898,876 A | 4/1999 | James |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,983,281 A | 11/1999 | Ogle et al. |
| 5,988,847 A | 11/1999 | McLaughlin et al. |
| 6,006,254 A | 12/1999 | Colby et al. |
| 6,006,260 A | 12/1999 | Barrick, Jr. et al. |
| 6,026,452 A | 2/2000 | Pitts |
| 6,028,857 A | 2/2000 | Poor |
| 6,051,159 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,249,801 B1 | 6/2001 | Zisapel et al. |
| 6,253,226 B1 | 6/2001 | Chidambaran et al. |
| 6,253,230 B1 | 6/2001 | Couland et al. |
| 6,263,358 B1 | 7/2001 | Lee et al. |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,618 B1 | 8/2002 | Cohen et al. |
| 6,434,801 B2 | 8/2002 | Grunberger |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,708,187 B1 | 3/2004 | Shanumgam et al. |
| 6,718,380 B1 | 4/2004 | Mohaban et al. |
| 6,742,045 B1 | 5/2004 | Jordan et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,826,698 B1 | 11/2004 | Minkin et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,975,592 B1 | 12/2005 | Seddigh et al. |
| 6,986,040 B1 | 1/2006 | Kramer et al. |
| 6,987,753 B2 | 1/2006 | Rochberger et al. |
| 7,007,092 B2 | 2/2006 | Peiffer |
| 7,058,633 B1 | 6/2006 | Gnagy et al. |
| 7,113,993 B1 | 9/2006 | Cappiello et al. |
| 7,133,944 B2 | 11/2006 | Song et al. |
| 7,139,792 B1 | 11/2006 | Mishra et al. |
| 7,185,359 B2 | 2/2007 | Schmidt et al. |
| 7,228,422 B2 | 6/2007 | Morioka et al. |
| 7,287,082 B1 | 10/2007 | O'Toole, Jr. |
| 7,295,827 B2 | 11/2007 | Liu et al. |
| 7,308,703 B2 | 12/2007 | Wright et al. |
| 7,308,709 B1 | 12/2007 | Brezak, et al. |
| 7,310,339 B1 | 12/2007 | Powers et al. |
| 7,319,696 B2 | 1/2008 | Inoue et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,383,570 B2 | 6/2008 | Pinkas et al. |
| 7,398,552 B2 | 7/2008 | Pardee et al. |
| 7,433,952 B1 | 10/2008 | Janssen et al. |
| 7,437,478 B2 | 10/2008 | Yokota et al. |
| 7,454,480 B2 | 11/2008 | Labio et al. |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,590,732 B2 | 9/2009 | Rune |
| 7,624,424 B2 | 11/2009 | Morita et al. |
| 7,644,137 B2 | 1/2010 | Bozak et al. |
| 7,668,166 B1 | 2/2010 | Rekhter et al. |
| 7,689,710 B2 | 3/2010 | Tang et al. |
| 7,724,657 B2 | 5/2010 | Rao et al. |

(56) References Cited

U.S. PATENT DOCUMENTS

| | | |
|---|---|---|
| 7,725,093 B2 | 5/2010 | Sengupta et al. |
| 7,769,845 B2 | 8/2010 | Baron |
| 7,778,187 B2 | 8/2010 | Chaturvedi et al. |
| 7,801,978 B1 | 9/2010 | Susai et al. |
| 7,808,913 B2 | 10/2010 | Ansari et al. |
| 7,831,652 B2 | 11/2010 | Clark et al. |
| 7,908,314 B2 | 3/2011 | Yamaguchi et al. |
| 7,925,908 B2 | 4/2011 | Kim |
| 7,930,365 B2 | 4/2011 | Dixit et al. |
| 7,933,946 B2 | 4/2011 | Livshits et al. |
| 7,945,908 B1 | 5/2011 | Waldspurger et al. |
| 7,984,141 B2 | 7/2011 | Gupta et al. |
| 8,041,022 B1 | 10/2011 | Andreasen et al. |
| 8,103,781 B1 | 1/2012 | Wu et al. |
| 8,130,650 B2 | 3/2012 | Allen, Jr. et al. |
| 8,149,819 B2 | 4/2012 | Kobayashi et al. |
| 8,189,567 B2 | 5/2012 | Kavanagh et al. |
| 8,199,757 B2 | 6/2012 | Pani et al. |
| 8,205,246 B2 | 6/2012 | Shatzkamer et al. |
| 8,239,954 B2 | 8/2012 | Wobber et al. |
| 8,274,895 B2 | 9/2012 | Rahman et al. |
| 8,321,908 B2 | 11/2012 | Gai et al. |
| 8,351,333 B2 | 1/2013 | Rao et al. |
| 8,370,933 B1 * | 2/2013 | Buckler .............. H04L 63/14 726/22 |
| 8,380,854 B2 | 2/2013 | Szabo |
| 8,417,817 B1 | 4/2013 | Jacobs |
| 8,447,871 B1 | 5/2013 | Szabo |
| 8,447,970 B2 | 5/2013 | Klein et al. |
| 8,452,876 B1 | 5/2013 | Williams et al. |
| 8,464,265 B2 | 6/2013 | Worley |
| 8,468,247 B1 | 6/2013 | Richardson et al. |
| 8,468,257 B2 | 6/2013 | Yigang |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,566,474 B2 | 10/2013 | Kanode et al. |
| 8,578,050 B2 | 11/2013 | Craig et al. |
| 8,606,921 B2 | 12/2013 | Vasquez et al. |
| 8,615,022 B2 | 12/2013 | Harrison et al. |
| 8,646,057 B2 | 2/2014 | Agarwal et al. |
| 8,665,858 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Gibbons et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,830,874 B2 | 9/2014 | Cho et al. |
| 8,873,753 B2 | 10/2014 | Parker |
| 8,875,274 B2 | 10/2014 | Montemurro et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 9,036,529 B2 | 5/2015 | Erickson et al. |
| 9,037,156 B2 | 5/2015 | de Wit et al. |
| 9,047,259 B1 | 6/2015 | Ho et al. |
| 9,077,554 B1 | 7/2015 | Szabo |
| 9,083,760 B1 | 7/2015 | Hughes et al. |
| 9,172,753 B1 | 10/2015 | Jiang et al. |
| 9,246,819 B1 | 1/2016 | Thirasuttakorn |
| 9,319,921 B2 | 4/2016 | Kuroda |
| 9,774,619 B1 * | 9/2017 | Radlein .............. H04L 63/1458 |
| 2001/0009554 A1 | 7/2001 | Katseff et al. |
| 2001/0023442 A1 | 9/2001 | Masters |
| 2001/0052016 A1 | 12/2001 | Skene et al. |
| 2002/0010783 A1 | 1/2002 | Primak et al. |
| 2002/0027504 A1 | 3/2002 | Davis |
| 2002/0032777 A1 | 3/2002 | Kawata et al. |
| 2002/0046291 A1 | 4/2002 | O'Callaghan et al. |
| 2002/0049842 A1 | 4/2002 | Huetsch et al. |
| 2002/0059428 A1 | 5/2002 | Susai et al. |
| 2002/0083067 A1 | 6/2002 | Tamayo |
| 2002/0095498 A1 | 7/2002 | Chanda et al. |
| 2002/0112061 A1 | 8/2002 | Shih et al. |
| 2002/0138615 A1 | 9/2002 | Schmeling |
| 2002/0161913 A1 | 10/2002 | Gonzalez et al. |
| 2002/0194342 A1 | 12/2002 | Lu et al. |
| 2002/0198993 A1 | 12/2002 | Cudd et al. |
| 2003/0037070 A1 | 2/2003 | Marston |
| 2003/0046291 A1 | 3/2003 | Fascenda |
| 2003/0058839 A1 | 3/2003 | D'Souza |
| 2003/0065653 A1 | 4/2003 | Overton et al. |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0086415 A1 | 5/2003 | Bernhard et al. |
| 2003/0105807 A1 | 6/2003 | Thompson et al. |
| 2003/0105983 A1 | 6/2003 | Brakmo et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0135509 A1 | 7/2003 | Davis et al. |
| 2003/0145062 A1 | 7/2003 | Sharma et al. |
| 2003/0145233 A1 | 7/2003 | Poletto et al. |
| 2003/0163578 A1 | 8/2003 | Janssen et al. |
| 2003/0200311 A1 | 10/2003 | Baum |
| 2003/0208596 A1 | 11/2003 | Carolan et al. |
| 2003/0225485 A1 | 12/2003 | Fritz et al. |
| 2004/0003287 A1 | 1/2004 | Zissimopoulos et al. |
| 2004/0052216 A1 * | 3/2004 | Roh .............. H04L 61/2503 370/252 |
| 2004/0072569 A1 | 4/2004 | Omae et al. |
| 2004/0078487 A1 | 4/2004 | Cernohous et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0148520 A1 | 7/2004 | Talpade et al. |
| 2004/0151186 A1 | 8/2004 | Akama |
| 2004/0190522 A1 | 9/2004 | Aerrabotu |
| 2004/0268358 A1 | 9/2004 | Li et al. |
| 2004/0199762 A1 | 10/2004 | Carlson et al. |
| 2004/0210663 A1 | 10/2004 | Phillips et al. |
| 2004/0225713 A1 | 11/2004 | Abbasi et al. |
| 2004/0255000 A1 | 12/2004 | Simionescu et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2005/0004887 A1 | 1/2005 | Igakura et al. |
| 2005/0021736 A1 | 1/2005 | Carusi et al. |
| 2005/0027869 A1 | 2/2005 | Johnson |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0078604 A1 | 4/2005 | Yim |
| 2005/0122942 A1 | 6/2005 | Rhee et al. |
| 2005/0122977 A1 | 6/2005 | Lieberman |
| 2005/0129001 A1 | 6/2005 | Backman et al. |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0198310 A1 | 9/2005 | Kim et al. |
| 2005/0262238 A1 | 11/2005 | Reeves et al. |
| 2005/0288939 A1 | 12/2005 | Peled et al. |
| 2006/0002405 A1 | 1/2006 | Le Sauze et al. |
| 2006/0031520 A1 | 2/2006 | Bedekar et al. |
| 2006/0036764 A1 | 2/2006 | Yokota et al. |
| 2006/0059267 A1 | 3/2006 | Cugi et al. |
| 2006/0077902 A1 | 4/2006 | Kannan et al. |
| 2006/0077986 A1 | 4/2006 | Rune |
| 2006/0083205 A1 | 4/2006 | Buddhikot et al. |
| 2006/0095573 A1 | 5/2006 | Carle et al. |
| 2006/0106802 A1 | 5/2006 | Giblin et al. |
| 2006/0112176 A1 | 5/2006 | Liu et al. |
| 2006/0112272 A1 | 5/2006 | Morioka et al. |
| 2006/0129684 A1 | 6/2006 | Datta |
| 2006/0135198 A1 | 6/2006 | Lee |
| 2006/0156416 A1 | 7/2006 | Huotari et al. |

(56) References Cited

U.S. PATENT DOCUMENTS

| | | |
|---|---|---|
| 2006/0161577 A1 | 7/2006 | Kulkarni et al. |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0182103 A1 | 8/2006 | Martini et al. |
| 2006/0184647 A1 | 8/2006 | Dixit et al. |
| 2006/0209853 A1 | 9/2006 | Hidaka et al. |
| 2006/0230148 A1 | 10/2006 | Forecast et al. |
| 2006/0233106 A1 | 10/2006 | Achlioptas et al. |
| 2006/0242300 A1 | 10/2006 | Yumoto et al. |
| 2006/0268704 A1 | 11/2006 | Ansari et al. |
| 2006/0291483 A1 | 12/2006 | Sela |
| 2006/0294054 A1 | 12/2006 | Kudo et al. |
| 2007/0006293 A1 | 1/2007 | Balakrishnan et al. |
| 2007/0016662 A1 | 1/2007 | Desai et al. |
| 2007/0019658 A1 | 1/2007 | Park et al. |
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0118669 A1* | 5/2007 | Rand .............. H04L 29/12066 709/245 |
| 2007/0118879 A1 | 5/2007 | Yeun |
| 2007/0174491 A1 | 7/2007 | Still et al. |
| 2007/0220598 A1 | 9/2007 | Salowey et al. |
| 2007/0233809 A1 | 10/2007 | Brownell et al. |
| 2007/0255848 A1 | 11/2007 | Sewall et al. |
| 2007/0258451 A1 | 11/2007 | Bouat |
| 2007/0297410 A1 | 12/2007 | Yoon et al. |
| 2007/0297551 A1 | 12/2007 | Choi |
| 2008/0008202 A1 | 1/2008 | Terrell et al. |
| 2008/0025297 A1 | 1/2008 | Kashyap |
| 2008/0028456 A1 | 1/2008 | O'Rourke et al. |
| 2008/0031258 A1 | 2/2008 | Acharya et al. |
| 2008/0034136 A1 | 2/2008 | Ulenas |
| 2008/0072303 A1 | 3/2008 | Syed |
| 2008/0120370 A1 | 5/2008 | Chan et al. |
| 2008/0130812 A1 | 6/2008 | Eom et al. |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0165801 A1 | 7/2008 | Sheppard |
| 2008/0178278 A1 | 7/2008 | Grinstein et al. |
| 2008/0201331 A1 | 8/2008 | Eriksen et al. |
| 2008/0201599 A1 | 8/2008 | Ferraiolo et al. |
| 2008/0205613 A1 | 8/2008 | Lopez |
| 2008/0209053 A1 | 8/2008 | Shen et al. |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0235508 A1 | 9/2008 | Ran et al. |
| 2008/0239986 A1 | 10/2008 | Xu et al. |
| 2008/0253395 A1 | 10/2008 | Pandya |
| 2008/0256224 A1 | 10/2008 | Kaji et al. |
| 2008/0279200 A1 | 11/2008 | Shatzkamer et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0028337 A1 | 1/2009 | Balabine et al. |
| 2009/0040926 A1 | 2/2009 | Li et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0094610 A1 | 4/2009 | Sukirya |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125622 A1 | 5/2009 | O'Sullivan et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0157678 A1 | 6/2009 | Turk |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0228956 A1 | 9/2009 | He et al. |
| 2009/0248893 A1 | 10/2009 | Richardson et al. |
| 2009/0287935 A1 | 11/2009 | Aull et al. |
| 2009/0296624 A1 | 12/2009 | Ryu et al. |
| 2009/0300407 A1 | 12/2009 | Kamath et al. |
| 2010/0011420 A1 | 1/2010 | Drako et al. |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0042693 A1 | 2/2010 | Eriksson et al. |
| 2010/0071048 A1 | 3/2010 | Novak et al. |
| 2010/0088417 A1 | 4/2010 | Amemiya et al. |
| 2010/0115236 A1 | 5/2010 | Bataineh et al. |
| 2010/0122091 A1 | 5/2010 | Huang et al. |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0188976 A1 | 7/2010 | Rahman et al. |
| 2010/0189052 A1 | 7/2010 | Kavanagh et al. |
| 2010/0242092 A1 | 9/2010 | Harris et al. |
| 2010/0251330 A1 | 9/2010 | Kroeselberg et al. |
| 2010/0279733 A1 | 11/2010 | Karsten et al. |
| 2010/0299451 A1 | 11/2010 | Yigang et al. |
| 2010/0322250 A1 | 12/2010 | Shetty et al. |
| 2010/0325277 A1 | 12/2010 | Muthiah et al. |
| 2011/0002339 A1* | 1/2011 | Fok .............. H04L 63/0236 370/401 |
| 2011/0029654 A1 | 2/2011 | Takeda et al. |
| 2011/0040889 A1 | 2/2011 | Garrett et al. |
| 2011/0047620 A1 | 2/2011 | Mahaffey et al. |
| 2011/0066718 A1 | 3/2011 | Susai et al. |
| 2011/0107077 A1 | 5/2011 | Henderson et al. |
| 2011/0141900 A1 | 6/2011 | Jayawardena et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0197059 A1 | 8/2011 | Klein et al. |
| 2011/0202676 A1 | 8/2011 | Craig et al. |
| 2011/0246800 A1 | 10/2011 | Accpadi et al. |
| 2011/0271005 A1 | 11/2011 | Bharrat et al. |
| 2011/0273984 A1 | 11/2011 | Hsu et al. |
| 2011/0277016 A1 | 11/2011 | Hockings et al. |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0079055 A1 | 3/2012 | Robinson |
| 2012/0101952 A1 | 4/2012 | Raleigh et al. |
| 2012/0124372 A1 | 5/2012 | Dilley et al. |
| 2012/0143883 A1 | 6/2012 | Chen et al. |
| 2012/0191847 A1 | 7/2012 | Nas et al. |
| 2012/0198043 A1 | 8/2012 | Hesketh et al. |
| 2012/0198512 A1 | 8/2012 | Zhou et al. |
| 2012/0210416 A1 | 8/2012 | Mihelich et al. |
| 2012/0210417 A1 | 8/2012 | Shieh |
| 2012/0224531 A1 | 9/2012 | Karuturi et al. |
| 2012/0311153 A1 | 12/2012 | Morgan |
| 2012/0317266 A1 | 12/2012 | Abbott |
| 2013/0003106 A1 | 1/2013 | Nishida et al. |
| 2013/0029726 A1 | 1/2013 | Berionne et al. |
| 2013/0044757 A1 | 2/2013 | Rai et al. |
| 2013/0091002 A1 | 4/2013 | Christie et al. |
| 2013/0163758 A1 | 6/2013 | Swaminathan et al. |
| 2013/0198322 A1 | 8/2013 | Oran et al. |
| 2013/0205361 A1 | 8/2013 | Narayanaswamy et al. |
| 2013/0212127 A1 | 8/2013 | Kitamura |
| 2013/0223421 A1* | 8/2013 | Gundavelli .......... H04W 76/12 370/338 |

(56) References Cited

U.S. PATENT DOCUMENTS

| | | |
|---|---|---|
| 2013/0336122 A1 | 12/2013 | Baruah et al. |
| 2013/0339429 A1 | 12/2013 | Richardson et al. |
| 2014/0040478 A1 | 2/2014 | Hsu et al. |
| 2014/0059678 A1 | 2/2014 | Parker |
| 2014/0095661 A1 | 4/2014 | Knowles et al. |
| 2014/0162705 A1 | 6/2014 | de Wit et al. |
| 2014/0171089 A1 | 6/2014 | Janakiraman et al. |
| 2014/0269484 A1 | 9/2014 | Dankberg et al. |
| 2014/0317404 A1 | 10/2014 | Carlson et al. |
| 2015/0127830 A1 | 5/2015 | Brown et al. |
| 2015/0358285 A1* | 12/2015 | Ellard ............... H04L 41/00 726/12 |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

Idoue, Akira et al. Mobile IP network supporting private IP addresses utilizing regional registration and NAT function. Proceedings. Eighth International Conference on Parallel and Distributed Systems. ICPADS 2001. https://ieeexplore.ieee.org/stamp/stamp.jsp?tp=&arnumber=934812 (Year: 2001).*

Maruyama, Shin et al. Policy-Based IP Address Selection in SCTP Automatic Address Reconfiguration. 2011 IEEE Workshops of International Conference on Advanced Information Networking and Applications. https://ieeexplore.ieee.org/stamp/stamp.jsp?tp=&arnumber=5763586 (Year: 2011).*

Nishiguchi, Masato; Kimura, Shigetomo. Communication Link Switching Method Based on Destination IP Address for Power Savings. 2016 Fourth International Symposium on Computing and Networking (CANDAR). https://ieeexplore.IEEE.org/stamp/stamp.jsp?tp=&arnumber=7818637 (Year: 2016).*

Jinlong, Hu; Yisheng, Wu. Source address validation based Ethernet switches for IPv6 network. 2012 IEEE International Conference on Computer Science and Automation Engineering (CSAE). https://ieeexplore.IEEE.org/stamp/stamp.jsp?tp=&arnumber=6272914 (Year: 2012).*

BIG-IP Local Traffic Manager: Implementations, Version 12.1, F5 Networks, Inc., May 4, 2018.

"A Process For Selective Routing of Servlet Content To Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

"Windows Server 2003 Kerberos Extensions," Microsoft TechNet, 8 pages, Jul. 31, 2004, http://technet.microsoft.com/en-us/library/cc738207, Microsoft Corporation.

ABAD Cristina L. et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

Crescendo Networks, "Application Layer Processing (ALP)," 2003-2009, pp. 168-186, Chapter 9, CN-5000E/5500E, Foxit Software Company.

European Search Report for corresponding EP Application No. 14753736.9, dated Sep. 23, 2016, pp. 1-8.

"Configuration Guide for Local Traffic Management," F5 Networks Inc., Jan. 12, 2006, version 9.2.2, 406 pgs.

Big-IP GTM and BIG-IP Link Controller, Release Notes, F5 Networks, Inc., Jul. 20, 2015, v.11.6.0.

BIG-IP Virtual, Release Notes, Dec. 8, 2014, F5 Networks, Inc., 4 pp, Edition 11.6.0.

BIG-IP® Global Traffic Manager™: Implementations, Aug. 20, 2014, F5 Networks, Inc., pp. 1-118, v11.6.

Big-IP® TMOS®: Routing Administration, F5 Networks, Inc., Apr. 10, 2015, pp. 1-140, v11.6.

F5 Networks. Local Traffic Manager and Global Traffic Manager Operations Guide, Manual, Dec. 12, 2014, pp. 1-160, v1.0.

Fielding et al., "Hypertext Transfer Protocol—HTTP/1.1," Network Working Group, RFC: 2068, Jan. 1997, pp. 1-162.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

International Search Report for International Patent Application No. PCT/US2013/026615 (dated Jul. 4, 2013).

International Search Report for International Patent Application No. PCT/US2014/018431 (dated Jul. 9, 2014).

Macvittie L., "Message-Based Load Balancing," Technical Brief, 2009, pp. 1-9, F5 Networks, Inc.

OWASP, "Testing for Cross site scripting", OWASP Testing Guide v2, Table of Contents, Sep. 5, 2013, pp. 1-5, (www.owasp.org/index.php/Testing_for_Cross_site scripting).

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

* cited by examiner

METHODS FOR MANAGING NETWORK CONNECTIONS BASED ON DNS DATA AND NETWORK POLICIES AND DEVICES THEREOF

This application claims the benefit of U.S. Provisional Patent Application Ser. No. 62/555,902, filed Sep. 8, 2017, which is hereby incorporated by reference in its entirety.

FIELD

This technology generally relates to methods and devices for network traffic management and, more particularly, to methods for managing network connections based on DNS data and network policies and devices thereof.

BACKGROUND

Transport layer security (TLS) inspection refers to authorized man in the middle (MITM) attacks on TLS or similar encrypted channels to obtain clear-text for inspection by antimalware, IDS, or DLP scanners and the MITM attack is generally carried out by a proxy device. Some use cases involves allowing traffic to some trusted services to bypass the inspection process. For example, to protect user credentials, one might allow connections to the websites of well-known firms to bypass inspection. Prior technologies recognize a trusted service by some credentials presented, such as PKI certificate, but this method is not always convenient because the certificate can include unverifiable credentials.

Alternatively, the trusted service also could be recognized either by the service's IP address or by its domain name. Unfortunately, the problem with recognizing trusted services by IP address is that many IP addresses are ephemeral and that results in making it difficult for a security administrator to maintain a list of trustworthy IP addresses; and an adversary may obtain and exploit a formerly-trustworthy IP address before a security administrator can get around to updating the list of trustworthy IP addresses.

SUMMARY

A method for managing network connections based on DNS data and network policies includes obtaining a destination internet protocol (IP) address and a domain name from a received request sent by a client. A determination is made about when the obtained domain name identifies a trusted service and the obtained destination IP address is included in a current host IP address list. The obtained destination IP address is replaced with a new IP address from the current host IP address list when the obtained domain name is determined to be present and the obtained destination IP address is determined to be absent from the current host IP address list. The received request is managed based on one or more network policies, where one of the one or more network policies includes providing the client access to the service identified by the obtained domain name hosted at the replaced new IP address.

A non-transitory computer readable medium having stored thereon instructions for managing network connections based on DNS data and network policies comprising machine executable code which when executed by at least one processor, causes the processor to perform steps including, obtaining a destination internet protocol (IP) address and a domain name from a received request sent by a client. A determination is made about when the obtained domain name identifies a trusted service and the obtained destination IP address is included in a current host IP address list. The obtained destination IP address is replaced with a new IP address from the current host IP address list when the obtained domain name is determined to be present and the obtained destination IP address is determined to be absent from the current host IP address list. The received request is managed based on one or more network policies, where one of the one or more network policies includes providing the client access to the service identified by the obtained domain name hosted at the replaced new IP address.

A network traffic management apparatus including at least one of configurable hardware logic configured to be capable of implementing or a processor coupled to a memory and configured to execute programmed instructions stored in the memory to obtain a destination internet protocol (IP) address and a domain name from a received request sent by a client. A determination is made about when the obtained domain name identifies a trusted service and the obtained destination IP address is included in a current host IP address list. The obtained destination IP address is replaced with a new IP address from the current host IP address list when the obtained domain name is determined to be present and the obtained destination IP address is determined to be absent from the current host IP address list. The received request is managed based on one or more network policies, where one of the one or more network policies includes providing the client access to the service identified by the obtained domain name hosted at the replaced new IP address.

A network traffic management system, comprising one or more traffic management apparatuses, client devices, or server devices, the network traffic management system comprising memory comprising programmed instructions stored thereon and one or more processors configured to be capable of executing the stored programmed instructions to obtaining a destination internet protocol (IP) address and a domain name from a received request sent by a client. A determination is made about when the obtained domain name identifies a trusted service and the obtained destination IP address is included in a current host IP address list. The obtained destination IP address is replaced with a new IP address from the current host IP address list when the obtained domain name is determined to be present and the obtained destination IP address is determined to be absent from the current host IP address list. The received request is managed based on one or more network policies, wherein one of the one or more network policies includes providing the client access to the service identified by the obtained domain name hosted at the replaced new IP address.

This technology provides a number of advantages including providing a method, non-transitory computer readable medium, apparatus, and system that assist with managing network connections based on DNS data and network policies.

DETAILED DESCRIPTION

Figure 1:
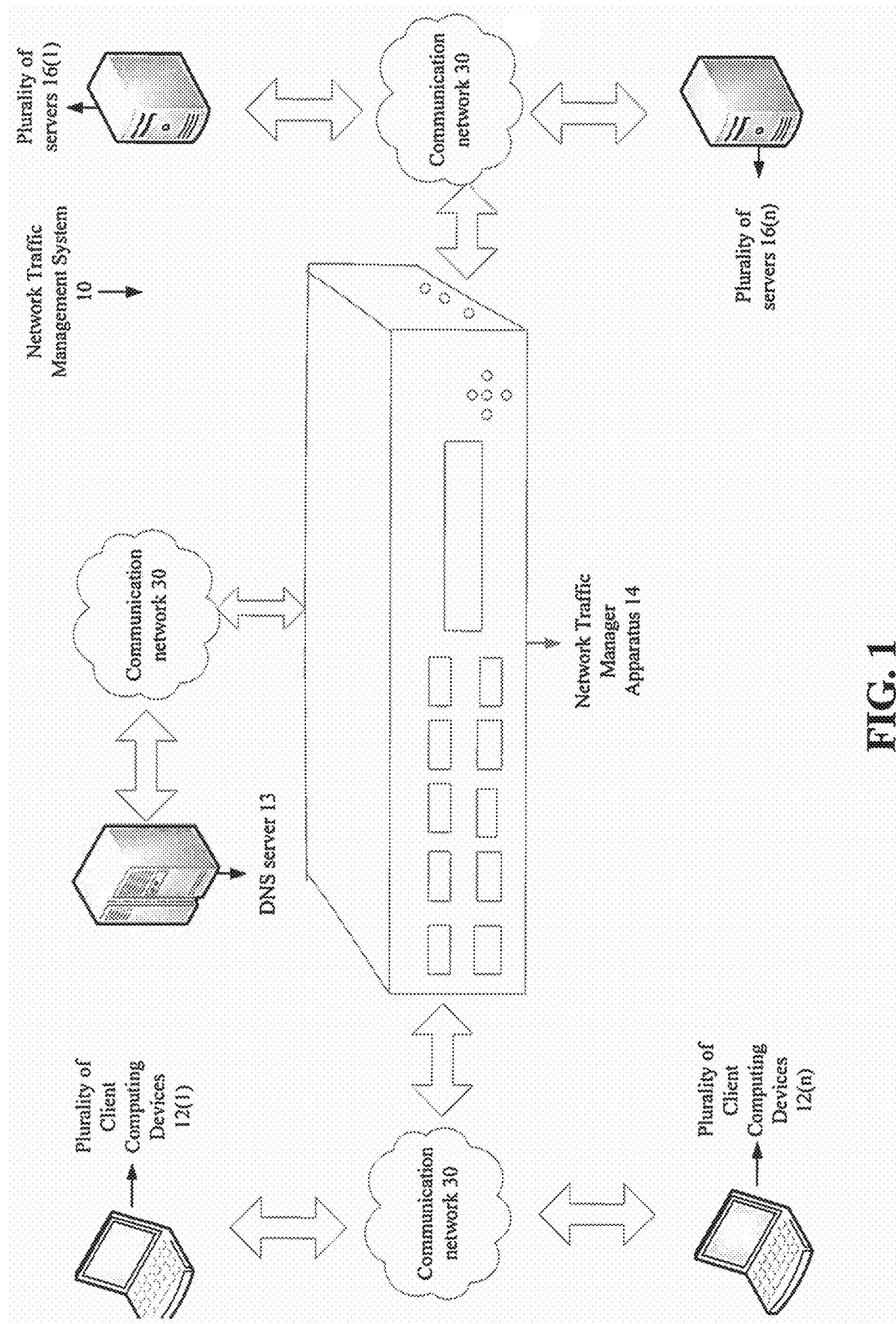
FIG. 1 is an example of a block diagram of a network traffic management system including a network traffic management apparatus for managing network connections based on DNS data and network policies.
Figure 2:
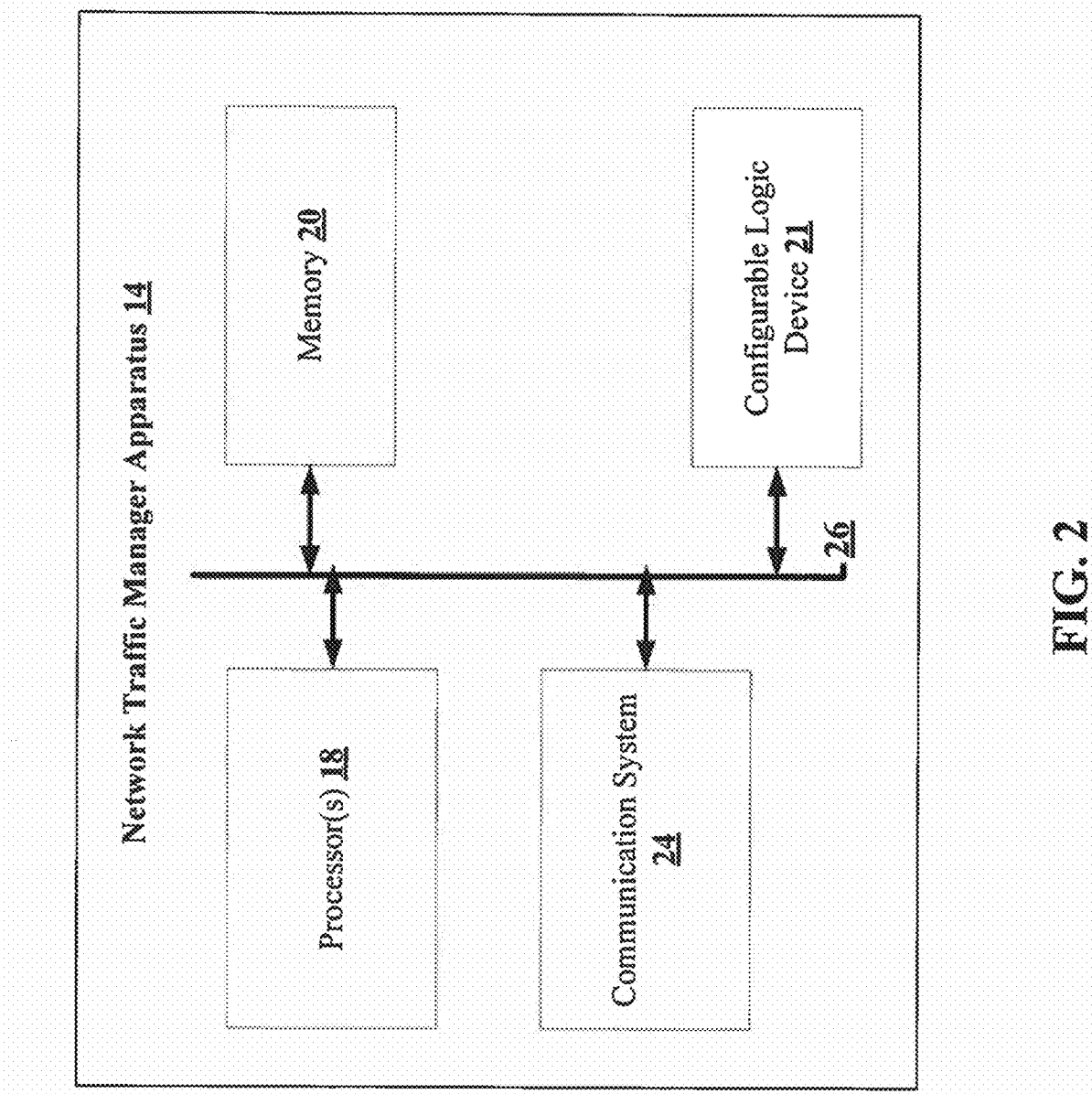
FIG. 2 is an example of a block diagram of a network traffic management apparatus.

An example of a network environment 10 which incorporates a network traffic management system for managing network connections based on DNS data and network policies with the network traffic manager apparatus 14 is illustrated in FIGS. 1 and 2. The exemplary environment 10 includes a plurality of client computing devices 12(1)-12(n), a DNS server 13, a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including managing network connections based on DNS data and network policies.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. As illustrated in FIG. 1, the network traffic manager apparatus 14 is coupled to the DNS server 13 through the communication network 30, although the network traffic manager apparatus 14 can be coupled to the DNS server 13 via other topologies. Additionally, the network traffic manager apparatus 14 is coupled to the plurality of servers 16(1)-16(n) through the communication network 30, although the web application servers 16(1)-16(n) and the network traffic manager apparatus 14 may be coupled together via other topologies. Furthermore, the plurality of servers 16(1)-16(n) is coupled to the DNS server 13 via communication network 30, although the plurality of servers 16(1)-16(n) can be coupled to the DNS server 13 via other topologies.

The network traffic manager apparatus 14 assists with managing network connections based on DNS data and network policies as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
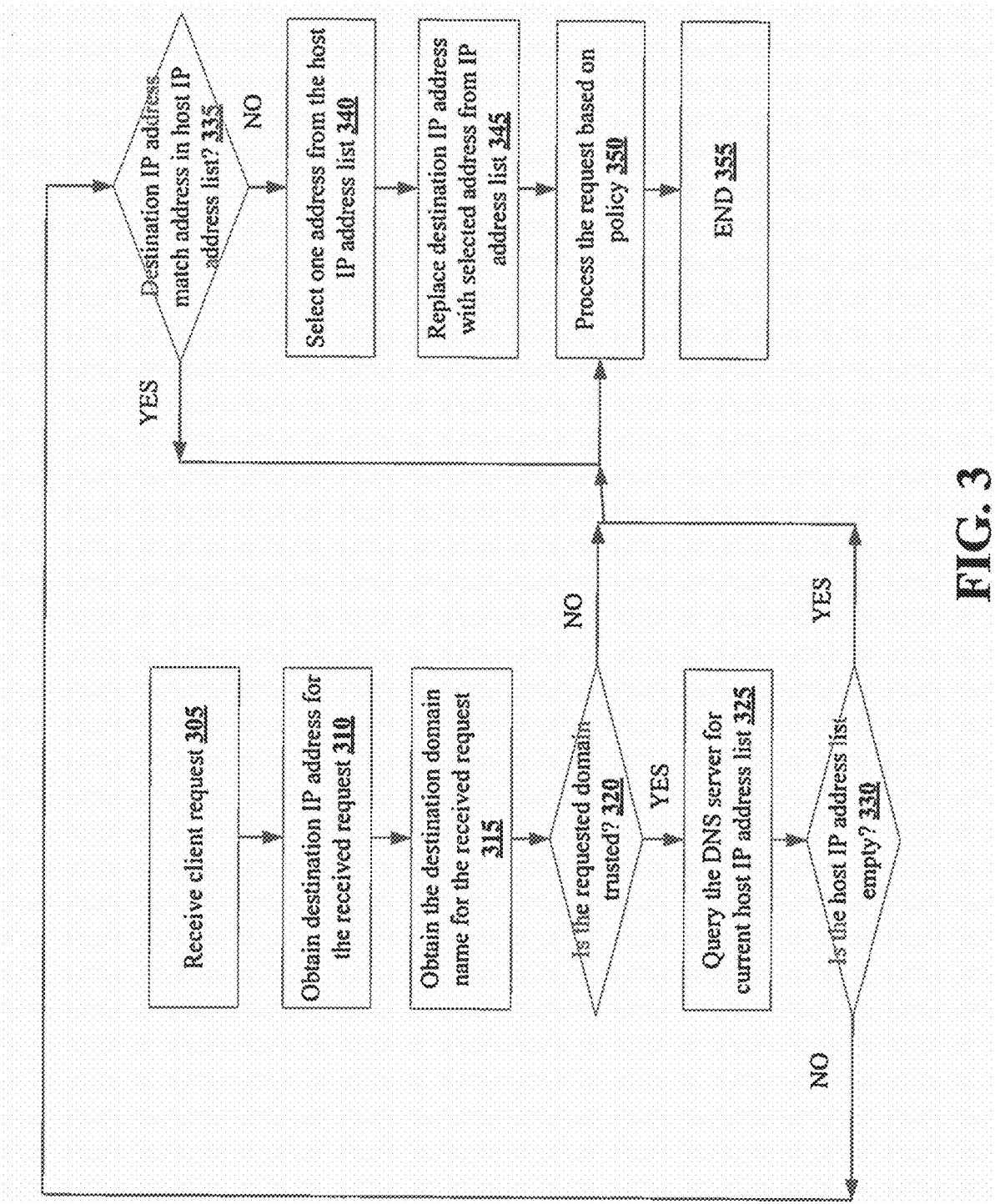
FIG. 3 is an exemplary flowchart of a method for managing network connections based on DNS data and network policies.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Figure 4:
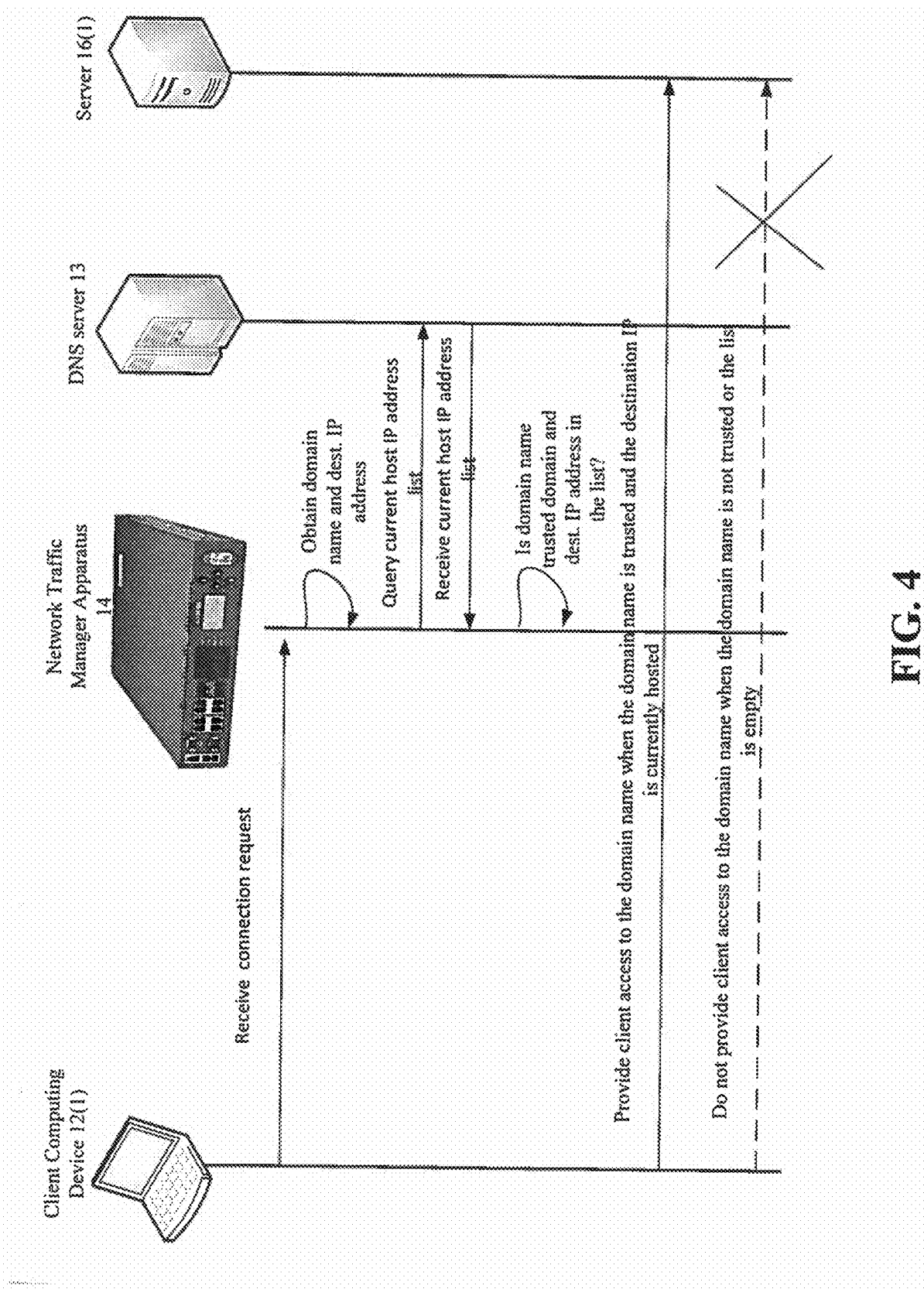
FIG. 4 is an exemplary sequence diagram for managing network connections based on DNS data and network policies.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the DNS server 13, the plurality of client computing devices 12(1)-12(n) and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the plurality of servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

The DNS server 13 in this example can include a central processing unit (CPU) or processor, a memory, input/display device interface, configurable logic device and an input/output system or I/O system, which are coupled together by a bus or other link. The DNS server 13, in this example, may run interface applications that may provide an interface to send and/or receive data to and/or from the network traffic manager apparatus 14 or the plurality of servers 16(1)-16(n). Additionally, the DNS server 13 can include any type of computing device that can receive, render, and facilitate user interaction, such as client computers, network computer, mobile computers, mobile phones, virtual machines (including cloud-based computer), or the like.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), the DNS server 13, network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of data requested by the plurality of client computing devices 12(1)-12(n), the DNS server 13, or the network traffic manager apparatus 14. The plurality of servers 16(1)-16(n) may provide data or receive data in response to requests directed toward the respective applications on the plurality web application servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single servers, one or more actions of the plurality of servers 16(1)-16(n) may be distributed across one or more distinct network computing devices. Moreover, the plurality of servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the plurality of servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the DNS server 13, the plurality of servers 16(1)-16(n), for example, may be configured to operate as virtual instances on the same physical machine. In other words, one or more of network traffic manager apparatus 14, the plurality of client computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of servers 16(1)-16(n) than depicted in FIG. 1. The plurality of client computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for managing network connections based on DNS data and network policies will now be described with reference to FIGS. 1-4. First in step 305, the network traffic manager apparatus 14 receives a connection request from one of the plurality of client computing devices 12(1)-12(n), although the network traffic manager apparatus 14 can receive other types of requests from other devices. By way of example, the connection request received can be a TLS connection request or a HTTP request, although the network traffic manager apparatus 14 can receive other types of requests.

Next in step 310, the network traffic manager apparatus 14 obtains the destination internet protocol (IP) address from the received request, although the network traffic manager apparatus 14 can obtain other addresses such as network address using other techniques.

Next in step 315, the network traffic manager apparatus 14 obtains the destination domain name requested by one of the plurality of client computing devices 12(1)-12(n) from the received request, although the network traffic manager apparatus 14 can obtain other symbolic names for services using other techniques.

Next in step 320, the network traffic manager apparatus 14 determines if the obtained destination domain name matches with a stored list of domain names of trusted services, although the network traffic manager apparatus 14 can use other techniques to determine if the obtained domain name identifies a trusted service. Accordingly, when the obtained destination domain name is present in the stored list of trusted domain names, the network traffic manager apparatus 14 determines that the obtained destination domain name is a trusted domain name. However, if the obtained destination domain name is not present in the stored list, then the network traffic manager apparatus 14 determines that the obtained destination domain name is not a trusted domain name. Accordingly, when the network traffic manager apparatus 14 determines that the obtained destination domain name is not a trusted domain name, a No branch is taken to step 350 where the network traffic manager apparatus 14 processes the received request based on one or more network policies which will be further illustrated below and the method ends at step 355. However, if the network traffic manager apparatus 14 determines that the obtained destination domain name is a trusted domain name, then the Yes branch is taken to step 325.

In step 325, the network traffic manager apparatus 14 queries the DNS server 13 for a host IP address list. In this example, the host IP address list includes data associated with devices currently hosting the service identified by the obtained destination domain name, although the network traffic manager apparatus 14 can use other techniques to obtain the host IP address list.

Next in step 330, the network traffic manager apparatus 14 determines if the host IP address list received from the DNS server 13 or obtained by other techniques is empty. If the network traffic manager apparatus 14 determines that the host IP address list is empty, a Yes branch is taken to step 350 which will be further illustrated below and the method ends at step 355. However, when the network traffic manager apparatus 14 determines that the host IP address list is not empty, then the No branch is taken to step 335.

In step 335, the network traffic manager apparatus 14 determines if the destination IP address obtained in step 310 is present in the host IP address list. In this example, the network traffic manager apparatus 14 compares the obtained destination IP address to the host IP address list to make sure that the client only connects to the trusted domain at a currently-valid host address. Accordingly, when the network traffic manager apparatus 14 determines that the obtained destination IP address is present in the host IP address list, then the Yes branch is taken to step 350 where the network traffic manager apparatus 14 provides the requesting one of the plurality of client computing devices 12(1)-12(n) access to the trusted domain at a currently-valid host address. However, when the network traffic manager apparatus 14 determines that the obtained destination IP address is not present in the host IP address list, then the No branch is taken step 340.

In step 340, the network traffic manager apparatus 14 selects one IP address from the list of host IP address received from the DNS server. In this example, the network traffic manager apparatus 14 selects the first IP address in the list of host IP addresses, although the network traffic manager apparatus 14 can select the host IP address using other techniques.

Next in step 345, the network traffic manager apparatus 14 replaces the destination IP address in the received request with the selected host IP address. In this example, the network traffic manager apparatus 14 replaces the destination IP address in the received request with the selected host IP address to ensure that the requesting one of the plurality of client computing devices 12(1)-12(n) connects to the trusted domain at the currently-valid host address.

In step 350, the network traffic manager apparatus 14 processes the received request by performing one or more network actions based on the one or more network policies. By way of example, one of the network policies can include providing the requesting one of the plurality of client computing devices 12(1)-12(n) access to the trusted domain at the currently-valid host address when the destination IP address matches the address in the host IP address list as determined in step 335. Additionally, another network policy can include rejecting the connection request for the requesting one of the plurality of client computing devices 12(1)-12(n) when either the host IP address is empty as determined in step 330 or when the requested domain is not trusted, as determined in step 320. Alternatively in another example, the one or more network policies can also include altering the detail of the network connection between the requesting one of the plurality of client computing devices 12(1)-12(n) and the plurality of servers 16(1)-16(n). The exemplary method ends at step 355.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for managing network connections based on DNS data and network policies, the method implemented by a network traffic management system comprising one or more network traffic apparatuses, client devices, or server devices, the method comprising:
   determining when an obtained domain name identifies a trusted service and an obtained destination IP address is included in a current host IP address list;
   replacing the obtained destination IP address with a new IP address from the current host IP address list when the obtained domain name is determined to be present and the obtained destination IP address is determined to be absent from the current host IP address list; and
   managing a received request based on a network policy comprising providing a client access to the trusted service identified by the obtained domain name hosted at the replaced new IP address.

2. The method as set forth in claim 1 further comprising selecting the new IP address from the current host IP address list comprising a plurality of IP addresses.

3. The method as set forth in claim 1 further comprising, declining the client access to the service identified by the obtained domain name when the obtained domain name is not the trusted domain name.

4. The method as set forth in claim 1 further comprising:
   obtaining the current host IP address list from a DNS server;
   determining when the obtained current host IP address list is empty; and
   managing the received request based on another network policy comprising declining the client access to the trusted service identified by the obtained domain name when the obtained current host IP address list is determined to be empty.

5. The method as set forth in claim 1 further comprising, providing the client access to the trusted service identified by the obtained domain name hosted at the obtained destination IP address when the obtained destination IP address is determined to be present in the current host IP address list.

6. A non-transitory computer readable medium having stored thereon instructions for managing network connections based on DNS data and network policies comprising executable code which when executed by one or more processors, causes the processors to:
   determine when an obtained domain name identifies a trusted service and an obtained destination IP address is included in a current host IP address list;
   replace the obtained destination IP address with a new IP address from the current host IP address list when the obtained domain name is determined to be present and the obtained destination IP address is determined to be absent from the current host IP address list; and
   manage a received request based on a network policy comprising providing a client access to the trusted service identified by the obtained domain name hosted at the replaced new IP address.

7. The medium as set forth in claim 6 further comprises, select the new IP address from the current host IP address list comprising a plurality of IP addresses.

8. The medium as set forth in claim 6 further comprises, decline the client access to the service identified by the obtained domain name when the obtained domain name is not the trusted domain name.

9. The medium as set forth in claim 6 further comprises:
   obtain the current host IP address list from a DNS server;
   determine when the obtained current host IP address list is empty; and
   manage the received request based on another network policy comprising declining the client access to the trusted service identified by the obtained domain name when the obtained current host IP address list is determined to be empty.

10. The medium as set forth in claim 6 further comprises, provide the client access to the trusted service identified by the obtained domain name hosted at the obtained destination IP address when the obtained destination IP address is determined to be present in the current host IP address list.

11. A network traffic manager apparatus, comprising memory comprising programmed instructions stored in the memory and one or more processors configured to be capable of executing the programmed instructions stored in the memory to:
   determine when an obtained domain name identifies a trusted service and an obtained destination IP address is included in a current host IP address list;
   replace the obtained destination IP address with a new IP address from the current host IP address list when the obtained domain name is determined to be present and the obtained destination IP address is determined to be absent from the current host IP address list; and manage a received request based on a network policy comprising providing a client access to the trusted service identified by the obtained domain name hosted at the replaced new IP address.

12. The network traffic manager apparatus as set forth in claim 11 wherein the one or more processors are further configured to be capable of executing the programmed instructions stored in the memory to select the new IP address from the current host IP address list comprising a plurality of IP addresses.

13. The network traffic manager apparatus as set forth in claim 11 wherein the one or more processors are further configured to be capable of executing the programmed instructions stored in the memory to decline the client access to the service identified by the obtained domain name when the obtained domain name is not the trusted domain name.

14. The network traffic manager apparatus as set forth in claim 11 wherein the one or more processors are further configured to be capable of executing the programmed instructions stored in the memory to:

obtain the current host IP address list from a DNS server;

determine when the obtained current host IP address list is empty; and manage the received request based on another network policy comprising declining the client access to the trusted service identified by the obtained domain name when the obtained current host IP address list is determined to be empty.

15. The network traffic manager apparatus as set forth in claim 11 wherein the one or more processors are further configured to be capable of executing the programmed instructions stored in the memory to provide the client access to the trusted service identified by the obtained domain name hosted at the obtained destination IP address when the obtained destination IP address is determined to be present in the current host IP address list.

16. A network traffic management system, comprising one or more traffic management apparatuses, client devices, or server devices, the network traffic management system comprising memory comprising programmed instructions stored thereon and one or more processors configured to be capable of executing the stored programmed instructions to:

determine when an obtained domain name identifies a trusted service and an obtained destination IP address is included in a current host IP address list;

replace the obtained destination IP address with a new IP address from the current host IP address list when the obtained domain name is determined to be present and the obtained destination IP address is determined to be absent from the current host IP address list; and manage a received request based on a network policy comprising providing a client access to the trusted service identified by the obtained domain name hosted at the replaced new IP address.

17. The network traffic management system of claim 16, wherein the one or more processors are further configured to be capable of executing the programmed instructions stored in the memory to select the new IP address from the current host IP address list comprising a plurality of IP addresses.

18. The network traffic management system of claim 16, wherein the one or more processors are further configured to be capable of executing the programmed instructions stored in the memory to decline the client access to the service identified by the obtained domain name when the obtained domain name is not the trusted domain name.

19. The network traffic management system of claim 18, wherein the one or more processors are further configured to be capable of executing the programmed instructions stored in the memory to:

obtain the current host IP address list from a DNS server;

determine when the obtained current host IP address list is empty; and manage the received request based on another network policy comprising declining the client access to the trusted service identified by the obtained domain name when the obtained current host IP address list is determined to be empty.

20. The network traffic management system of claim 18, wherein the one or more processors are further configured to be capable of executing the programmed instructions stored in the memory to provide the client access to the trusted service identified by the obtained domain name hosted at the obtained destination IP address when the obtained destination IP address is determined to be present in the current host IP address list.

* * * * *